United States Patent [19]
Thorick

[11] Patent Number: 5,947,768
[45] Date of Patent: Sep. 7, 1999

[54] POWER DISTRIBUTION SYSTEM ISOLATOR

[76] Inventor: William E. Thorick, 22692 Kenrick Loop, Maple Ridge, BC, Canada, V2X 8Z1

[21] Appl. No.: 09/026,147

[22] Filed: Feb. 19, 1998

[51] Int. Cl.⁶ .................................................. H01R 33/945
[52] U.S. Cl. .............................. 439/577; 307/64; 361/48
[58] Field of Search .............................. 439/577; 307/64, 307/65, 9; 361/54, 48

[56] References Cited

U.S. PATENT DOCUMENTS 3,857,044 12/1974 Papoi et al. ................................. 307/9
5,503,571 4/1996 Cheslock ................................. 439/577
5,574,622 11/1996 Brown ..................................... 439/577

Primary Examiner—Paula Bradley
Assistant Examiner—Katrina Davis

[57] ABSTRACT

A power distribution system isolator is provided including a trailer having a hitch and a pair of wheels for transportation purposes. Also included is an electrical assembly with a fuse and a pair of cables each connected to the fuse for connecting to a power distribution system to isolate the same.

8 Claims, 2 Drawing Sheets

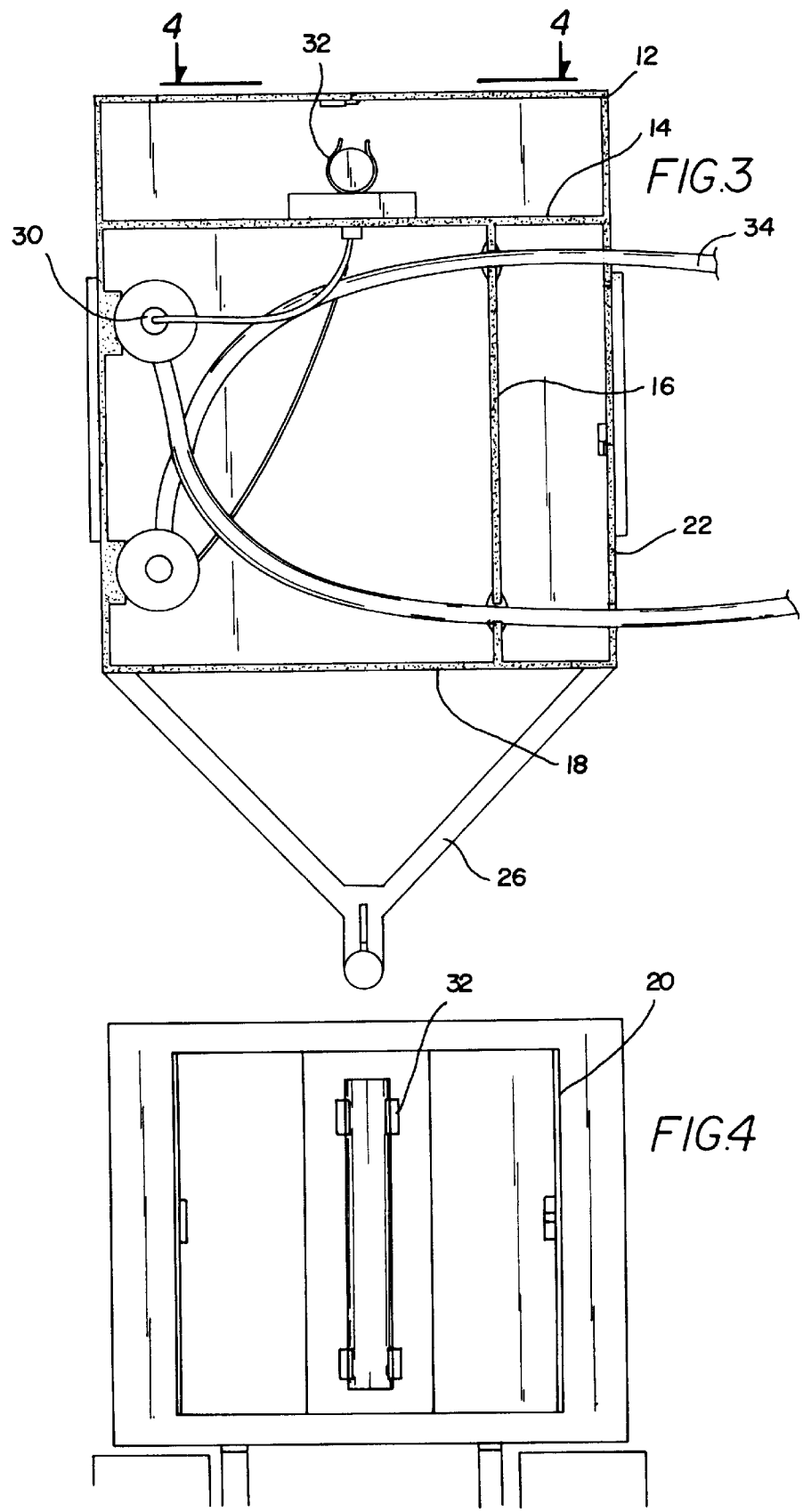

POWER DISTRIBUTION SYSTEM ISOLATOR

BACKGROUND OF THE INVENTION

1. Field of the Invention

The present invention relates to power system related devices and more particularly pertains to a new power distribution system isolator for temporarily isolating a power distribution system via a mobile unit so as to avoid an outage.

2. Description of the Prior Art

The use of power system related devices is known in the prior art. More specifically, power system related devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art power system related devices include U.S. Pat. No. 4,703,191; U.S. Pat. No. 5,268,850; U.S. Pat. Des. 266,235; U.S. Pat. No. 4,587,588; U.S. Pat. No. 5,191,229; and U.S. Pat. No. 4,675,539.

In these respects, the power distribution system isolator according to the present invention substantially departs from the conventional concepts and designs of the prior art, and in so doing provides an apparatus primarily developed for the purpose of temporarily isolating a power distribution system via a mobile unit so as to avoid an outage.

SUMMARY OF THE INVENTION

In view of the foregoing disadvantages inherent in the known types of power system related devices now present in the prior art, the present invention provides a new power distribution system isolator construction wherein the same can be utilized for temporarily isolating a power distribution system via a mobile unit so as to avoid an outage.

The general purpose of the present invention, which will be described subsequently in greater detail, is to provide a new power distribution system isolator apparatus and method which has many of the advantages of the power system related devices mentioned heretofore and many novel features that result in a new power distribution system isolator which is not anticipated, rendered obvious, suggested, or even implied by any of the prior art power system related devices, either alone or in any combination thereof.

To attain this, the present invention generally comprises a trailer constructed from an insulative dielectric material. As shown in the various Figures, the trailer includes a bottom face, a top face, a pair of side faces and a pair of end faces integrally coupled thereby defining an interior space. The interior space includes a rear divider integrally coupled between the side faces adjacent to and in parallel with the rear face. The rear divider defines a small rear compartment and a large front compartment. Associated therewith is a front divider integrally coupled between the front face and the rear divider adjacent to and in parallel with a first one of the side faces thereby subdividing the front compartment into a large compartment and a small compartment. Note FIG. 4. The front one of the end faces is removable for allowing access to the large compartment. The rear one of the end faces has a pair of access doors hingably coupled to opposite side faces. As such, access to the rear compartment is permitted. The first one of the side faces has a pair of access doors for allowing access to the small compartment. Also mounted to the first one of the side faces is a pair of exterior L-shaped mounts which reside adjacent to opposite end faces and further the top face. The trailer has a V-shaped hitch coupled to the front one of the end faces. The hitch extends forwardly from the trailer for coupling with a vehicle. A pair of wheels are rotatably mounted to the bottom face for transportation purposes. Also included is an electrical assembly having a pair of potheads mounted on a second one of the side faces of the trailer within the large compartment of the interior space of the trailer. A fuse is mounted on the first divider within the rear compartment of the interior space of the trailer. As shown in FIGS. 3 & 4, the fuse is equipped with a pair of contacts electrically connected to a pair of electrical connectors. These electrical connectors are in turn mechanically coupled to an associated one of the potheads. In use, the pair of contacts are adapted to receive a fuse for electrically connecting the same. The electrical assembly further includes a pair of cables each having a first end mechanically coupled to an associated one of the potheads. It should be noted that the first ends of the cables are further electrically connected to the corresponding electrical connector. As shown in FIG. 3, the cables extend through the insulated apertures formed in the front divider for being temporarily connected to an electrical power system.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new power distribution system isolator apparatus and method which has many of the advantages of the power system related devices mentioned heretofore and many novel features that result in a new power distribution system isolator which is not anticipated, rendered obvious, suggested, or even implied by any of the prior art power system related devices, either alone or in any combination thereof.

It is another object of the present invention to provide a new power distribution system isolator which may be easily and efficiently manufactured and marketed.

It is a further object of the present invention to provide a new power distribution system isolator which is of a durable, and reliable construction.

An even further object of the present invention is to provide a new power distribution system isolator which is susceptible of a low cost of manufacture with regard to both materials and labor, and which accordingly is then susceptible of low prices of sale to the consuming public, thereby making such power distribution system isolator economically available to the buying public.

Still yet another object of the present invention is to provide a new power distribution system isolator which provides in the apparatuses and methods of the prior art some of the advantages thereof, while simultaneously overcoming some of the disadvantages normally associated therewith.

Still another object of the present invention is to provide a new power distribution system isolator for temporarily isolating a power distribution system via a mobile unit so as to avoid an outage.

Even still another object of the present invention is to provide a new power distribution system isolator that includes a trailer having a hitch and a pair of wheels for transportation purposes. Also included is an electrical assembly with a fuse and a pair of cables each connected to the fuse for connecting to a power distribution system to isolate the same.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a top view of the present invention.

FIG. 4 is a rear view of the present invention showing the fuse mount.

DESCRIPTION OF THE PREFERRED EMBODIMENT

Figure 1:
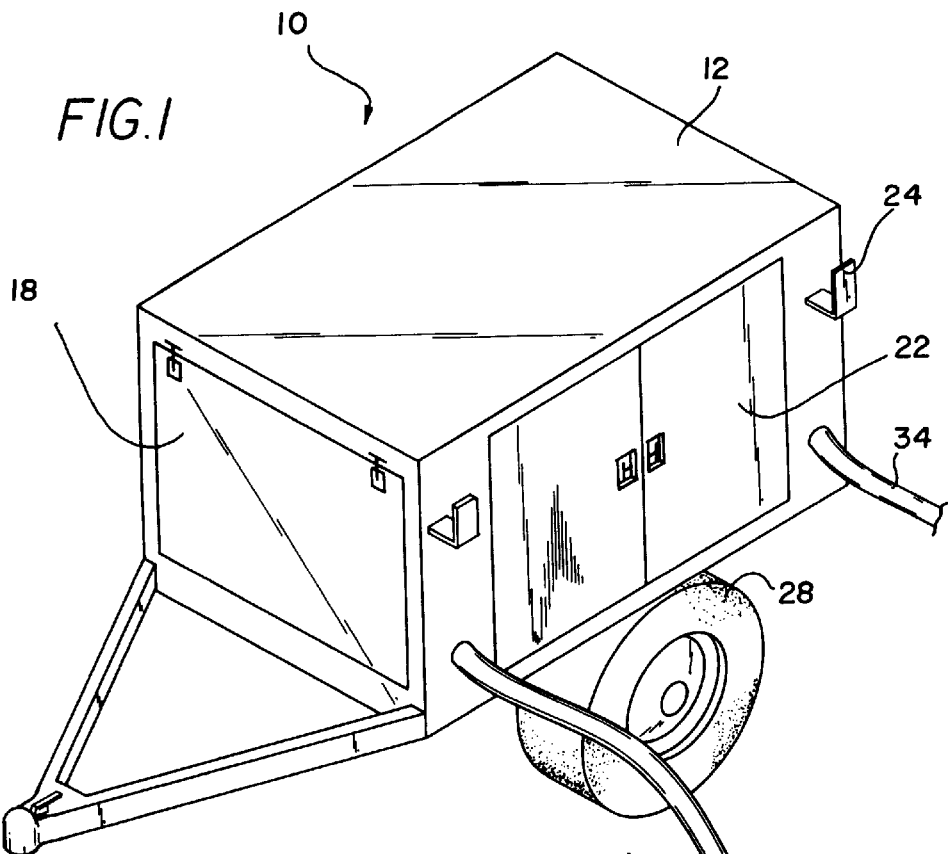
FIG. 1 is a perspective view of a new power distribution system isolator according to the present invention.
Figure 2:
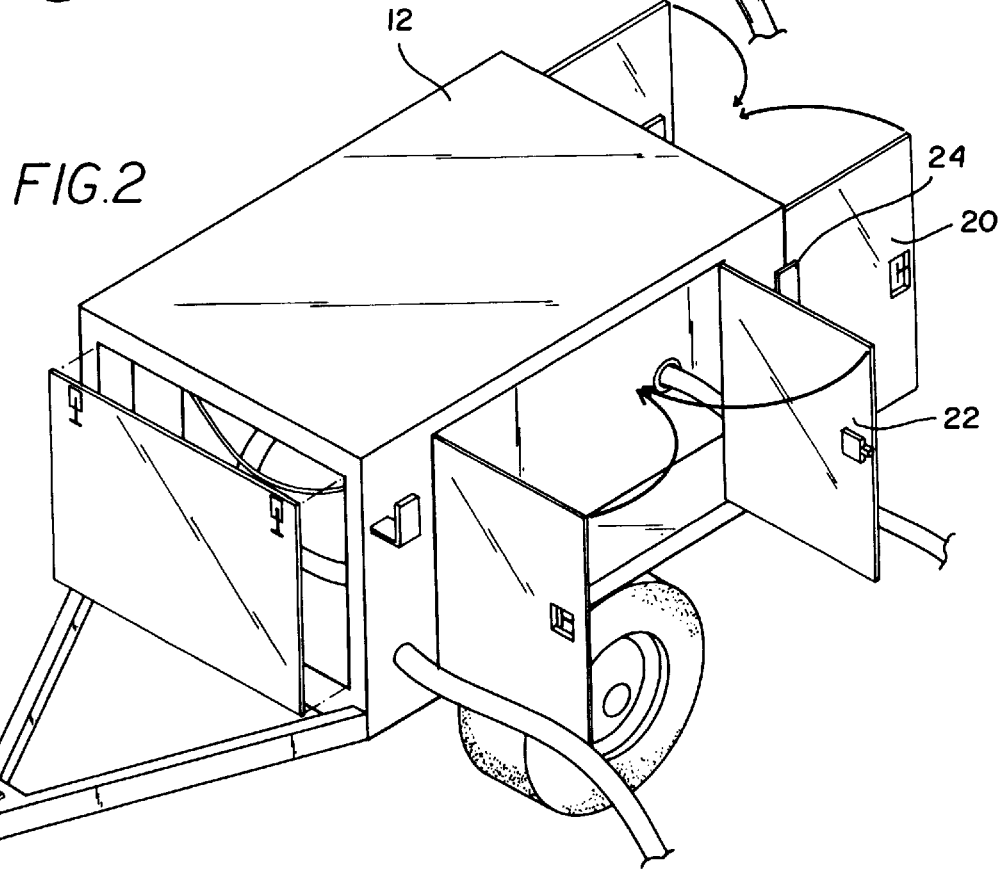
FIG. 2 is a perspective view of the present invention with the access doors opened.

With reference now to the drawings, and in particular to FIGS. 1 through 4 thereof, a new power distribution system isolator embodying the principles and concepts of the present invention and generally designated by the reference numeral 10 will be described.

The present invention, designated as numeral 10, includes a trailer 12 constructed from an insulative dielectric material. As shown in the various Figures, the trailer includes a bottom face, a top face, a pair of side faces and a pair of end faces integrally coupled thereby defining an interior space. The interior space includes a rear divider 14 integrally coupled between the side faces adjacent to and in parallel with the rear face. The rear divider defines a small rear compartment and a large front compartment. Associated therewith is a front divider 16 integrally coupled between the front face and the rear divider adjacent to and in parallel with a first one of the side faces thereby subdividing the front compartment into a large compartment and a small compartment. Note FIG. 4.

The front one of the end faces 18 is removable for allowing access to the large compartment. The rear one of the end faces has a pair of lockable access doors 20 hingably coupled to opposite side faces. As such, access to the rear compartment is permitted. The first one of the side faces also has a pair of lockable access doors 22 for allowing access to the small compartment. Also mounted to the first one of the side faces is a pair of exterior L-shaped mounts 24 which reside adjacent to opposite end faces and further the top face.

The trailer has a V-shaped hitch 26 coupled to the front one of the end faces. The hitch extends forwardly from the trailer for coupling with a vehicle. A pair of wheels 28 are rotatably mounted to the bottom face for transportation purposes.

Also included is an electrical assembly having a pair of potheads 30 mounted on a second one of the side faces of the trailer within the large compartment of the interior space of the trailer. A fuse 32 is mounted on the first divider within the rear compartment of the interior space of the trailer. As shown in FIGS. 3 & 4, the fuse is equipped with a pair of contacts electrically connected to a pair of electrical connectors. These electrical connectors are in turn mechanically coupled to an associated one of the potheads. In use, the pair of contacts are adapted to receive a vertically oriented fuse for electrically connecting the same. In the preferred embodiment, the fuse is an S&C SM-4S SNUFFLER.

The electrical assembly further includes a pair of cables 34 each having a first end mechanically coupled to an associated one of the potheads. The cables include a load cable and a line cable each of which comprise of 30 foot insulated 25 KVA power cables with unillustrated 25 KVA elbow connectors. It should be noted that the first ends of the cables are further electrically connected to the corresponding electrical connector. As shown in FIG. 3, the cables extend through insulated apertures formed in the front divider for being temporarily connected to an electrical power system for temporarily isolating the same.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A portable cable interconnector comprising, in combination:

a trailer constructed from an insulative dielectric material including a bottom face, a top face, a pair of side faces and a pair of end faces integrally coupled thereby defining an interior space, the interior space including a rear divider integrally coupled between the side faces adjacent to and in parallel with the rear face for defining a small rear compartment and a large front compartment and a front divider integrally coupled between the front face and the rear divider adjacent to and in parallel with a first one of the side faces thereby subdividing the front compartment into a large compartment and a small compartment, the front one of the end faces being removable for allowing access to the large compartment, the rear one of the end faces having a pair of access doors hingably coupled to opposite side faces for allowing access to the rear compartment, the first one of the side faces having a pair of access doors for allowing access to the small compartment and further a pair of exterior L-shaped mounts each coupled thereto adjacent to opposite end faces and further the top face, the trailer having a V-shaped hitch coupled to the front one of the end faces and extending forwardly therefrom for coupling with a vehicle and a pair of wheels rotatably mounted to the bottom face for transportation, purposes;

and an electrical assembly including a pair of potheads mounted on a second one of the side faces of the trailer within the large compartment of the interior space of the trailer, a fuse mount situated on the first divider within the rear compartment of the interior space of the trailer with a pair of contacts electrically connected to a pair of electrical connectors which are in turn mechanically coupled to an associated one of the potheads wherein the pair of contacts are adapted to receive a fuse for electrically connecting the same, and a pair of cables each having a first end mechanically coupled to an associated one of the potheads and electrically connected to the corresponding electrical connector, wherein the cables extend through insulated apertures formed in the front divider for being temporarily connected to an electrical power system.

2. A power distribution system isolator comprising:

a trailer having a hitch and a pair of wheels for transportation purposes; and an electrical assembly mounted on the trailer and including a fuse and a pair of cables each connected to the fuse, the cables adapted for connecting to a power distribution system for isolating the same.

3. A power distribution system isolator as set forth in claim 2 wherein the fuse is situated within the trailer.

4. A power distribution system isolator as set forth in claim 2 wherein the trailer is constructed from a dielectric material.

5. A power distribution system isolator as set forth in claim 2 wherein a pair of potheads are mounted on the trailer for supporting an end of the cables and further providing an interconnection between the cables and a pair of electrical connectors which are in turn connected to the fuse.

6. A power distribution system isolator as set forth in claim 5 wherein the potheads are mounted within an interior space of the trailer.

7. A power distribution system isolator as set forth in claim 6 wherein the trailer is subdivided into a plurality of compartments for housing the fuse and potheads separately.

8. A power distribution system isolator as set forth in claim 7 wherein each compartment is accessed via at least one separate door.

\* \* \* \* \*